US012276381B2

(12) United States Patent
Shao et al.

(10) Patent No.: US 12,276,381 B2
(45) Date of Patent: Apr. 15, 2025

(54) METHODS FOR ASSESSING LOSS OF MAINTENANCE MEDIUM OF SMART GAS PIPELINE NETWORK AND INTERNET OF THINGS (IOT) SYSTEMS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/414,424

(22) Filed: Jan. 16, 2024

(65) Prior Publication Data

US 2024/0151368 A1 May 9, 2024

(30) Foreign Application Priority Data

Dec. 20, 2023 (CN) ......................... 202311761715.4

(51) Int. Cl.
*F17D 5/06* (2006.01)
*F17D 5/00* (2006.01)

(52) U.S. Cl.
CPC ............... *F17D 5/06* (2013.01); *F17D 5/005* (2013.01)

(58) Field of Classification Search
CPC .................................. F17D 5/06; F17D 5/005
See application file for complete search history.

(56) References Cited

U.S. PATENT DOCUMENTS

2007/0222436 A1* 9/2007 Gao ....................... G01N 27/82 324/220
2008/0125884 A1* 5/2008 Schumacher ...... G05B 23/0286 700/79

(Continued)

FOREIGN PATENT DOCUMENTS

CN 107120533 9/2017
CN 113723834 A 11/2021

(Continued)

OTHER PUBLICATIONS

Guo, Zhanglin et al., City Gas Pipeline Risk Assessment Research Based on Hyperbolic Risk Decision Model and GIS, Urban Gas, 11: 27-31, 2013.

(Continued)

*Primary Examiner* — Mohamed Charioui
*Assistant Examiner* — Xiuqin Sun
(74) *Attorney, Agent, or Firm* — METIS IP LLC

(57) ABSTRACT

The present disclosure provides a method and an Internet of Things (IoT) system for assessing a loss of a maintenance medium of a smart gas pipeline network. The method comprises: determining a degree of a maintenance impact based on maintenance data; determining a target supply for a maintenance pipeline branch in a target time period based on the degree of the maintenance impact and historical supply data; determining a target demand for the maintenance pipeline branch in the target time period based on historical usage data; determining a target loss in the target time period based on the target supply and the target demand; and determining a replenishment parameter based on the target loss.

14 Claims, 5 Drawing Sheets

(56) References Cited

U.S. PATENT DOCUMENTS

| | | | | |
|---|---|---|---|---|
| 2013/0116941 | A1* | 5/2013 | Lie-Nielsen | G01F 15/063 702/46 |
| 2018/0275100 | A1* | 9/2018 | Sutherland | G05D 7/0676 |
| 2018/0348080 | A1* | 12/2018 | Inoue | G01M 3/243 |
| 2023/0281535 | A1 | 9/2023 | Shao et al. | |

FOREIGN PATENT DOCUMENTS

| | | | |
|---|---|---|---|
| CN | 115640914 | | 1/2023 |
| CN | 115718448 | A | 2/2023 |
| CN | 115879913 | | 3/2023 |
| CN | 116258347 | | 6/2023 |
| CN | 116862710 | A | 10/2023 |
| CN | 117132026 | | 11/2023 |

OTHER PUBLICATIONS

First Office Action in Chinese Application No. 202311761715.4 mailed on Jan. 26, 2024, 13 pages.

Notification to Grant Patent Right for Invention in Chinese Application No. 202311761715.4 mailed on Mar. 15, 2024, 4 pages.

* cited by examiner

METHODS FOR ASSESSING LOSS OF MAINTENANCE MEDIUM OF SMART GAS PIPELINE NETWORK AND INTERNET OF THINGS (IOT) SYSTEMS

CROSS-REFERENCES TO RELATED APPLICATIONS

This application claims priority of Chinese Patent Application No. 202311761715.4, filed on Dec. 20, 2023, the content of which is entirely incorporated herein by reference.

TECHNICAL FIELD

The present disclosure relates to the field of Internet of Things (IoT) technology, and in particular, to a method for assessing a loss of a maintenance medium of a smart gas pipeline network and an Internet of Things (IoT) system.

BACKGROUND

In the current social development, the process of urbanization is accelerating, and gas has become an indispensable basic energy source for people's lives. The gas pipeline network, as a pipeline network for supplying gas to gas users, needs to be effectively maintained and serviced. When repair or maintenance of the gas pipeline network is carried out, a gas decompression device will be set up near the maintenance area, where high-pressure gas will be regulated through the gas decompression device to reduce to a safe working pressure.

CN111126859A discloses a digital acquisition system and method based on an industrial internet, which is used for dispatching and allocating gas supply based on gas data by a gas dispatching center through a data analysis module. However, on-site maintenance conditions are difficult to obtain, which makes it difficult to determine the exact time of restoration of the gas supply and the amount of restoration of the gas supply, and thus makes it difficult to accurately dispatch and allocate the amount of the gas supply and adjust the gas supply for the gas users.

Therefore, it is desirable to provide a method for assessing a loss of a maintenance medium of a smart gas pipeline network and an IoT system that can accurately restore gas supply for gas users in time after maintenance of a gas pipeline is completed.

SUMMARY

One or more embodiments of the present disclosure provide a method for assessing a loss of a maintenance medium of a smart gas pipeline network, implemented based on a smart gas safety management platform of an Internet of Things (IoT) system for assessing a loss of a maintenance medium of a smart gas pipeline network, comprising: determining a degree of a maintenance impact based on maintenance data; determining a target supply for a maintenance pipeline branch in a target time period based on the degree of the maintenance impact and historical supply data; determining a target demand for the maintenance pipeline branch in the target time period based on historical usage data; determining a target loss in the target time period based on the target supply and the target demand; and determining a replenishment parameter based on the target loss.

One or more embodiments of the present disclosure provide a system for assessing a loss of a maintenance medium of a smart gas pipeline network. An IoT system may include a smart gas user platform, a smart gas service platform, a smart gas safety management platform, a smart gas sensor network platform, and a smart gas object platform. The smart gas safety management platform may be configured to: determine a degree of a maintenance impact based on maintenance data, the maintenance data being obtained from the smart gas object platform through the smart gas sensor network platform; determine a target supply for a maintenance pipeline branch in a target time period based on the degree of the maintenance impact and historical supply data; determine a target demand for the maintenance pipeline branch in the target time period based on historical usage data, the historical usage data being obtained from the smart gas object platform through the smart gas sensor network platform; determine a target loss in the target time period based on the target supply and the target demand; and determine a replenishment parameter for a gas loss based on the target loss, the replenishment parameter being transmitted to the smart gas object platform through the smart gas sensor network platform.

One or more embodiments of the present disclosure provide a non-transitory computer readable storage medium, comprising computer instructions that, when read by a computer, may direct the computer to execute the method for assessing the loss of the maintenance medium of the smart gas pipeline network.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
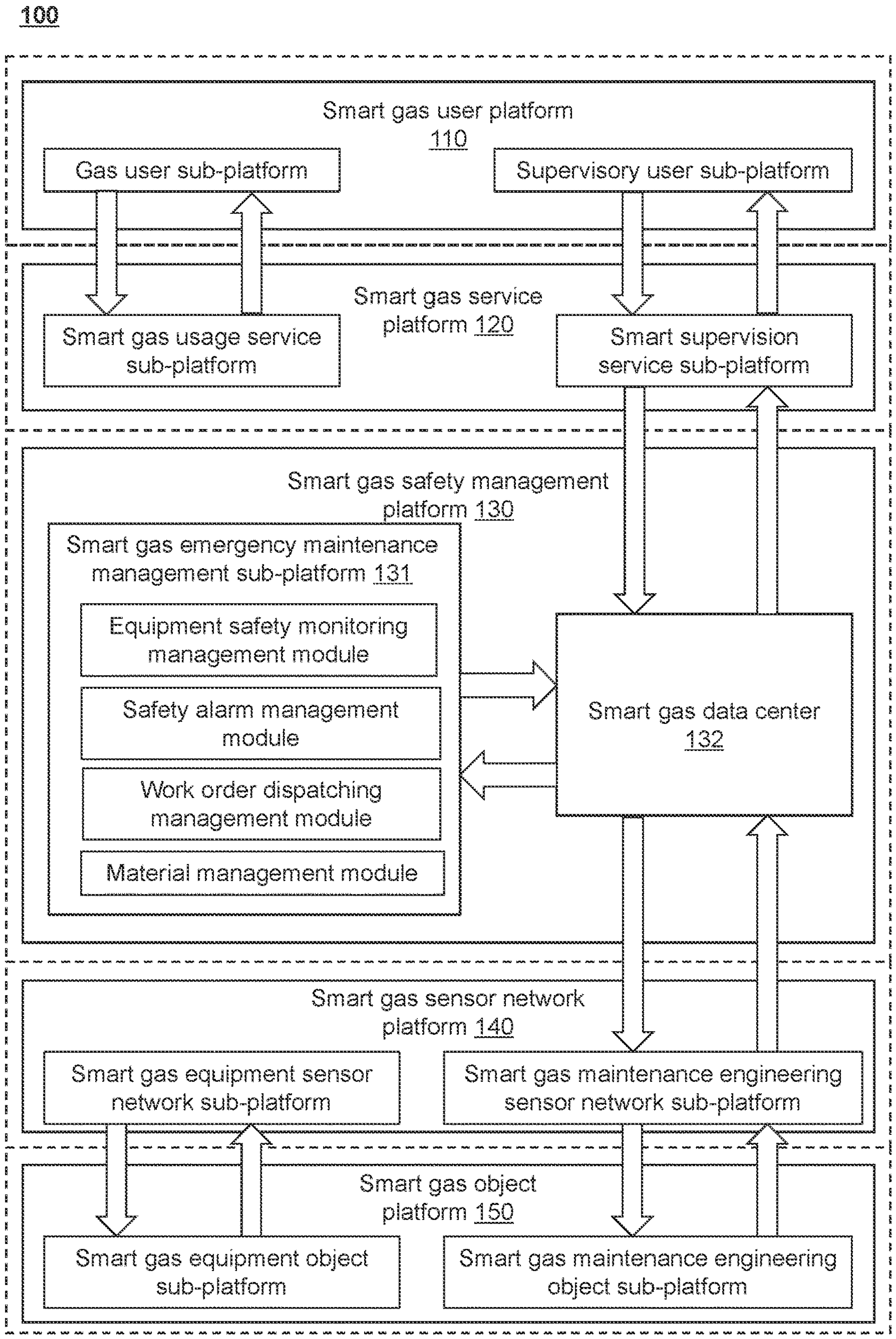
FIG. 1 is a structural diagram illustrating an exemplary IoT system for assessing a loss of a maintenance medium of a smart gas pipeline network according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

In a gas pipeline system, the gas may pass through a high-pressure gas pipeline as the gas is transported from a supply station to a user's home or industrial facility. When the gas pipeline is maintained or repaired, the pressure of the gas in the gas pipeline needs to be reduced to ensure the safety of the repair process. After the repair is complete, the gas pressure reduction device may be removed and the gas supply may be then restored to a normal pressure and flow. However, there is a discrepancy between the gas supply to a gas pipeline branch being repaired during the repair process and the gas supply to the gas pipeline branch in a normal state.

CN111126859A may improve the security of a periodic measurement report by assigning an identification number to a gas gate station and embedding a watermark in the periodic measurement report, which facilitates multiple inspections of the periodic measurement report and prevents the periodic measurement report from being modified during transmission. However, the solution only prevents a gas dispatching center from making unreasonable gas dispatching assignments based on erroneous periodic measurement reports, but cannot accurately and timely dispatch the gas after the maintenance is completed.

Accordingly, some embodiments of the present disclosure are expected to provide a method for assessing a loss of a maintenance medium of a smart gas pipeline network and an IoT system to predict a gas loss based on historical data and maintenance data of the gas, thereby accurately adjusting the gas supply to the gas users after the maintenance is completed.

FIG. 1 is a structural diagram illustrating an exemplary IoT system for assessing a loss of a maintenance medium of a smart gas pipeline network according to some embodiments of the present disclosure.

In some embodiments, as illustrated in FIG. 1, an IoT system 100 for assessing a loss of a maintenance medium of a smart gas pipeline network may include a smart gas user platform 110, a smart gas service platform 120, a smart gas safety management platform 130, a smart gas sensor network platform 140, and a smart gas object platform 150.

The smart gas user platform 110 refers to a platform configured to interact with users. The users may include a gas user, a gas safety supervisory user, a gas operator, etc. In some embodiments, the smart gas user platform 110 may be configured as a terminal device.

In some embodiments, the smart gas user platform 110 may include a gas user sub-platform and a supervisory user sub-platform.

The gas user sub-platform refers to a platform that provides gas users with data related to gas usage and solutions to gas problems. The gas users may include an industrial gas user, a commercial gas user, an ordinary gas user, etc.

The supervisory user sub-platform refers to a platform for supervisory users to supervise operation of the entire IoT system. The supervisory users may be persons from a safety management department.

The smart gas service platform 120 refers to a platform configured to communicate user needs and control information. The smart gas service platform 120 may obtain information such as a maintenance duration, a maintenance type, etc., from the smart gas safety management platform 130, and send the information to the smart gas user platform 110.

In some embodiments, the smart gas service platform 120 may include a smart gas usage service sub-platform and a smart supervision service sub-platform.

The smart gas usage service sub-platform refers to a platform that provides the gas users with gas services.

The smart supervision service sub-platform refers to a platform that provides supervisory needs for the supervisory users.

The smart gas safety management platform 130 refers to a platform that integrates and coordinates connection and collaboration between various functional platforms, aggregates all the information of the IoT, and provides perception management and control management functions for the IoT operation system.

In some embodiments, the smart gas safety management platform 130 may include a smart gas emergency maintenance management sub-platform 131 and a smart gas data center 132.

The smart gas emergency maintenance management sub-platform 131 refers to a platform configured to analyze and process gas emergency maintenance management data.

In some embodiments, the smart gas emergency maintenance management sub-platform 131 may include, but is not limited to, an equipment safety monitoring management module, a safety alarm management module, a work order dispatching management module, and a material management module.

The smart gas data center 132 may be configured to store and manage all operation information of the IoT system 100 for assessing the loss of the maintenance medium of the smart gas pipeline network. In some embodiments, the smart gas data center 132 may be configured as storage equipment (e.g., a database) for storing historical and current safety management data of gas equipment and data of the gas pipeline network.

In some embodiments, the smart gas safety management platform 130 may interact with the smart gas service platform 120 and the smart gas sensor network platform 140 for information through the smart gas data center 132, respectively.

For example, the smart gas data center 132 may send information such as the maintenance duration, the maintenance type, a maintenance shutdown notice, a decompression degree of the gas pipeline network, etc., to the smart gas service platform 120.

As another example, the smart gas data center 132 may send an obtaining instruction and a control instruction to the smart gas sensor network platform 140.

In some embodiments, the smart gas data center 132 may send the maintenance data of the gas pipeline network to the smart gas emergency maintenance management sub-platform 131 for analysis and processing to obtain analysis and processing results.

The smart gas sensor network platform 140 may be a functional platform that manages sensor communication. In some embodiments, the smart gas sensor network platform 140 may implement functions of sensor communication for perceptional information and sensor communication for control information.

In some embodiments, the smart gas sensor network platform 140 may include a smart gas equipment sensor network sub-platform and a smart gas maintenance engineering sensor network sub-platform.

The smart gas equipment sensor network sub-platform may be configured to obtain operation information of the gas equipment and send control information of the gas equipment. For example, the smart gas equipment sensor network sub-platform may send the obtaining instruction to the smart gas object platform 150. As another example, the smart gas equipment sensor network sub-platform may send the control command to the smart gas object platform 150 to adjust gas supply based on a replenishment parameter. The replenishment parameter may be transmitted to the smart gas object platform through the smart gas sensor network platform.

The smart gas object platform 150 may be a functional platform for generating the perceptional information and executing the control information. For example, the smart gas object platform 150 may record and generate gas data, maintenance data, and historical usage data, and upload the gas data, the maintenance data, and the historical usage data to the smart gas data center 132 through the smart gas sensor network platform 140. As another example, the smart gas object platform 150 may execute the control information sent to the smart gas sensor network platform 140 through the smart gas data center 132.

In some embodiments, the smart gas object platform 150 may include a smart gas equipment object sub-platform and a smart gas maintenance engineering object sub-platform.

In some embodiments, the smart gas equipment object sub-platform may be configured as various types of gas equipment and monitoring equipment. For example, the gas equipment may include pipeline network equipment (e.g., a gas pipeline network, valve control equipment, a gas storage tank, etc.); and the monitoring equipment may include a gas flowmeter, a pressure sensor, and a temperature sensor.

In some embodiments, the smart gas equipment object sub-platform may obtain historical supply data and historical gas usage data of the gas equipment based on the monitoring equipment, and upload and store the historical supply data and the historical gas usage data of the gas equipment in the smart gas data center 132 through the smart gas equipment sensor network sub-platform.

In some embodiments, the smart gas equipment object sub-platform may also execute the control information sent by the smart gas sensor network platform.

In some embodiments, the smart gas maintenance engineering object sub-platform may be configured as equipment related to maintenance of the gas equipment, such as a hand-held terminal of a maintenance person, maintenance equipment, etc.

In some embodiments, the smart gas maintenance engineering object sub-platform may obtain the maintenance data of the gas pipeline network based on the maintenance equipment and upload the maintenance data of the gas pipeline network to the smart gas data center 132 through the smart gas maintenance engineering sensor network sub-platform.

In some embodiments of the present disclosure, according to the IoT system 100 for assessing the loss of the maintenance medium of the smart gas pipeline network, a closed loop of information operation may be formed between the smart gas object platform and the smart gas user platform and may be unified for coordinated and regular operation under the management of the smart gas management platform, thereby realizing informatization and intellectualization of assessment management of the loss of the maintenance medium of the gas pipeline network.

Figure 2:
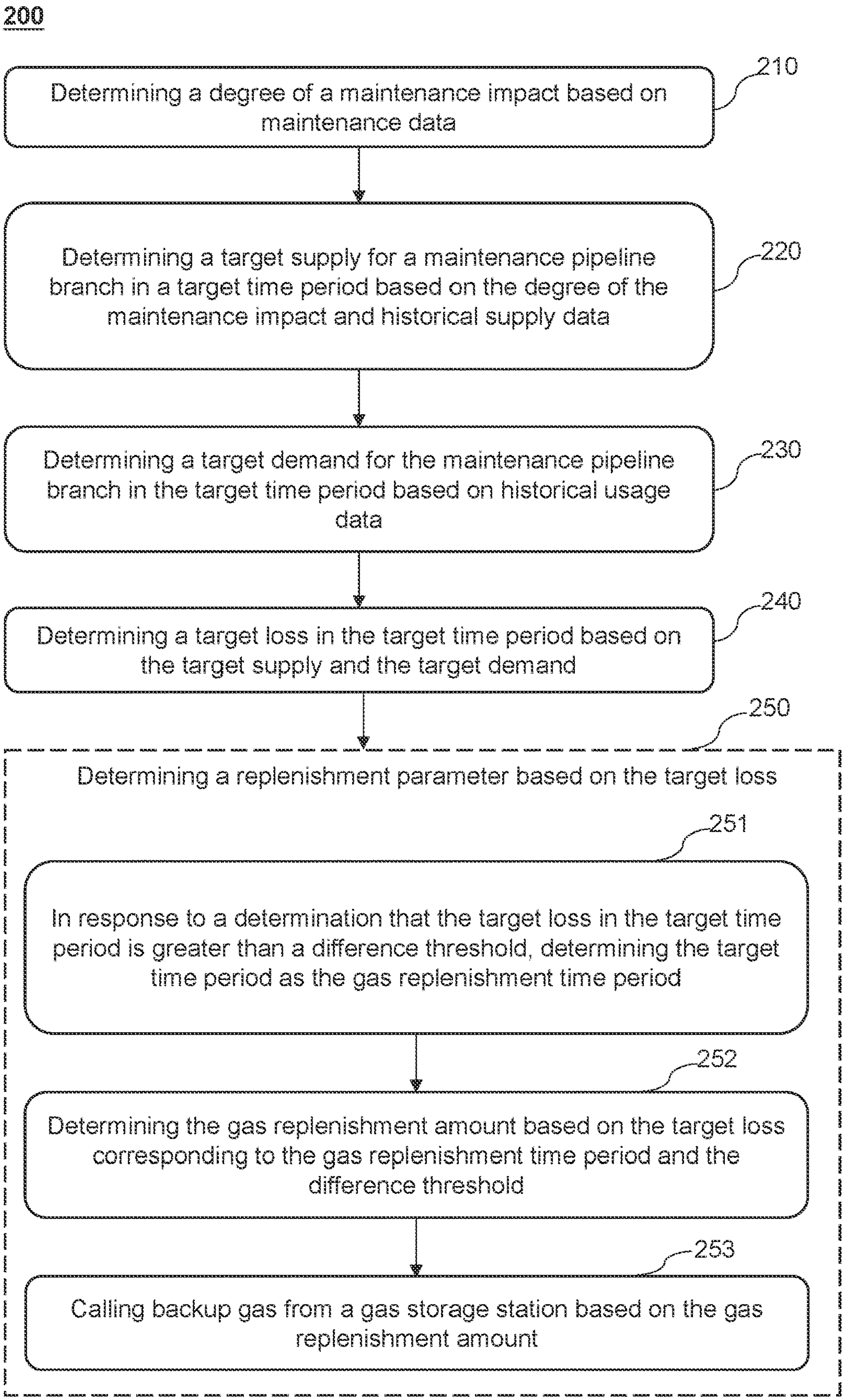
FIG. 2 is a flowchart illustrating an exemplary method for assessing a loss of a maintenance medium of a smart gas pipeline network according to some embodiments of the present disclosure.

FIG. 2 is a flowchart illustrating an exemplary method for assessing a loss of a maintenance medium of a smart gas pipeline network according to some embodiments of the present disclosure. As illustrated in FIG. 2, a process 200 may include the following operations. In some embodiments, the process 200 may be performed by a smart gas safety management platform.

Operation 210, determining a degree of a maintenance impact based on maintenance data.

The maintenance data refers to data related to a maintenance pipeline. In some embodiments, the maintenance data may include on a maintenance time point, a maintenance type, a maintenance process, information of a maintenance person, etc. The maintenance process may include inspecting, welding, replacing a pipeline component, cleaning clogging, or the like. The information of the maintenance person may include years of service, technical grade, or the like, of the maintenance person.

The degree of the maintenance impact refers to a relevant indicator reflecting a degree of impact caused by maintenance on gas supply. In some embodiments, the degree of the maintenance impact may include time consumption for each maintenance process, a gas supply restoration duration, a degree of maintenance shutdown or decompression, etc.

The degree of maintenance shutdown or decompression refers to a degree of impact of suspension of the gas supply or decompression supply in the maintenance process, such as a duration of the suspension or decompression and a count of gas users involved. The time consumption for each maintenance process and the degree of maintenance shutdown or decompression may be obtained based on the maintenance data by querying the historical data.

The gas supply restoration duration refers to time required for restoration of a tail end of a maintenance pipeline branch to normal gas supply after the maintenance is completed. In some embodiments, the smart gas safety management platform may record time at which the maintenance is completed as T1, and collect gas delivery information of the tail end of the maintenance pipeline branch after the time of T1. When a similarity of the collected gas delivery information to reference gas delivery information is higher than a preset similarity threshold, the gas supply may be considered to be restored to the normal gas supply, and time may be recorded as T2. The gas supply restoration duration may be determined by T2−T1.

The gas delivery information refers to information related to gas delivery, such as a gas flow rate, an operation temperature, an operation pressure, etc. The reference gas delivery information refers to information about gas delivery at the tail end of the maintenance pipeline branch when the maintenance pipeline branch operates normally in historical conditions.

In some embodiments, the smart gas safety management platform may determine the degree of the maintenance impact by vector matching and weighted averaging. For example, the smart gas safety management platform may construct a current feature vector based on current maintenance data, conduct a search in a vector database based on the current feature vector, search a plurality of vectors of which distances from the current feature vector are less than a distance threshold as first reference vectors, and obtain a plurality of reference degrees of maintenance impact stored in association with the first reference vectors in the vector database. The vector database may include a plurality of historical feature vectors constructed based on historical maintenance data, and store the degree of the maintenance impact and historical supply data corresponding to historical maintenance time periods and historical gas supply restoration time periods, etc., in association.

In some embodiments, the smart gas safety management platform may perform weighted averaging on a plurality of indicator values of a same type corresponding to the plurality of reference degrees of the maintenance impacts, and use a weighted average value as an indicator value of the type corresponding to a current degree of the maintenance impact. A weight of each of the plurality of indicator values may be related to a distance between the current feature vector and the first reference vector corresponding to the indicator value, and the smaller the distance, the larger the weight.

Operation 220, determining a target supply for a maintenance pipeline branch in a target time period based on the degree of the maintenance impact and historical supply data.

The historical supply data refers to supply data related to historical gas supply. The historical supply data may include supply data for historical maintenance time periods and/or historical gas supply restoration time periods. In some embodiments, the supply data may be readings from gas metering equipment at different times in the gas pipeline network, such as readings from first metering equipment and second metering equipment. The first metering equipment may be located on a trunk of the gas pipeline network, and only one first metering device may be provided for metering total historical supply data for all branches of the gas pipeline network. The second metering equipment may be located on each pipeline branch of the gas pipeline network, and the second metering equipment may be at least provided at the tail end of each pipeline branch for obtaining a gas supply condition at each tail end of the pipeline.

The maintenance pipeline branch refers to a pipeline branch where a maintenance position is located. In some embodiments, the smart gas safety management platform may divide the entire gas pipeline network into pipeline branches based on a pipeline network design map. The pipeline network design map refers to a design map regarding a distribution of the gas pipeline network.

The target time period refers to a time period during which the gas supply may be affected by the maintenance. In some embodiments, the target time period may include a maintenance time period and a gas supply restoration time period.

The maintenance time period refers to a time period of the entire maintenance process.

The gas supply restoration time period refers to a time period between completion of the maintenance and restoration to normal gas supply.

In some embodiments, the maintenance time period and the gas supply restoration time period may also be divided into subperiods based on different divisions for determining the target supply.

In some embodiments, the smart gas safety management platform may divide the maintenance time period into a plurality of first subperiods based on a first division manner, and divide the gas supply restoration time period into a plurality of second subperiods based on a second division manner. Gas supply features of each subperiod may form a corresponding gas supply feature sequence based on a time sequence.

The first division manner refers to a way of dividing subperiods based on differences in maintenance operations. For example, one maintenance operation may correspond to one first subperiod.

The second division manner refers to a way of dividing subperiods based on a preset interval. The preset interval may be set by a technician based on experience. A time span of the second subperiods may be less than a time span of the first subperiods.

The target supply refers to a target gas supply for the pipeline branch in the target time period.

In some embodiments, the smart gas safety management platform may determine the target supply in target time period based on the degree of the maintenance impact and the historical supply data in various ways. For example, the smart gas safety management platform may generate a first predetermined table based on the historical time periods, the historical degrees of maintenance impact, and the historical supply data, and determine the target supply in the target time period by querying the first predetermined table.

In some embodiments, the smart gas safety management platform may determine a supply sequence for the gas supply restoration time period based on the degree of the maintenance impact, the historical supply data, etc. Detailed descriptions may be found in FIG. 3 and related descriptions thereof.

Operation 230, determining a target demand for the maintenance pipeline branch in the target time period based on historical usage data.

The historical usage data refers to historical data related to gas usage of users, such as historical gas usage. In some embodiments, the historical usage data may be read by third metering equipment. Each gas user may correspond to one third metering equipment. The third metering equipment may be configured to obtain gas usage data of the gas users.

The target demand refers to a target gas demand for the pipeline branch.

In some embodiments, the smart gas safety management platform may, based on the historical usage data of all the gas users on the maintenance pipeline branch, statistically count the gas demand for the maintenance pipeline branch in historical time periods corresponding to the target time period. For example, assuming that a current time point when the maintenance starts is 10:00 a.m., and the target time period is 10:30-10:50 a.m., the historical time period corresponding to the target time period may be a time period of 10:30-10:50 a.m. in the historical data. The historical usage of the maintenance pipeline branch at 10:30-10:50 a.m. in a past half-month may be obtained. The historical usage of all the gas users on the maintenance pipeline branch in the time period of 10:30-10:50 a.m. may be added up, and an average value of the historical usage of the maintenance pipeline branch in the time period in the past half-month may be calculated. The average value may be used as the target demand in the target time period of 10:30-10:50 a.m.

Operation 240, determining a target loss in the target time period based on the target supply and the target demand.

The target loss refers to a target difference between the target demand and the target supply.

In some embodiments, the smart gas safety management platform may calculate the target loss based on the target demand and the target supply in different time periods, respectively. For example, for one time period of the target time period, such as a time period A, a target loss in the time period A may be calculated, and the target loss in the time period A=the target demand in the time period A−the target supply in the time period A.

Operation 250, determining a replenishment parameter based on the target loss.

The gas loss refers to a loss resulting from the maintenance of the gas pipeline network by taking measures such as gas shutdown or decompression supply to reduce the gas supply to the maintenance pipeline branch.

The replenishment parameter refers to a parameter related to gas replenishment in response to the gas loss. The replenishment parameter may include a total volume of gas to be replenished, the gas flow rate, and a gas replenishment time. For example, when the gas loss is 10,000 cubic meters, the corresponding replenishment parameter may include a total volume of gas to be replenished that is not less than 10,000 cubic meters.

In some embodiments, the smart gas safety management platform may determine the replenishment parameter for the gas loss in various ways. For example, the smart gas safety management platform may determine the replenishment parameter for the gas loss by querying a second predetermined table. The second predetermined table may be constructed based on historical gas losses and historical replenishment parameters.

In some embodiments, the replenishment parameter may include a gas replenishment time period and a gas replenishment amount for the gas replenishment time period.

In some embodiments, the smart gas safety management platform may further determine the replenishment parameter by operations 251-253 below.

Operation 251, in response to a determination that the target loss in the target time period is greater than a difference threshold, determining the target time period as the gas replenishment time period.

The gas replenishment time period refers to a time period of the target time period when gas replenishment is required.

The difference threshold refers to a threshold for determining whether a target loss amount of gas needs to be replenished. In some embodiments, the difference threshold may be predetermined by a technician based on priori knowledge or historical experience. In some embodiments, the maintenance time period and the gas supply restoration time period may have a corresponding difference threshold, respectively. The difference thresholds corresponding to different maintenance time periods or different gas supply restorage time periods may be different.

Operation 252, determining the gas replenishment amount based on the target loss corresponding to the gas replenishment time period and the difference threshold.

The gas replenishment amount refers to an amount of gas that needs to be replenished during the gas replenishment time period.

In some embodiments, the smart gas safety management platform may determine the gas replenishment amount based on the target loss and the difference threshold through a mathematical manner. For example, the smart gas safety management platform may subtract the difference threshold from the target loss for each gas replenishment time period, and then use a sum obtained by adding calculation results for all time periods as the gas replenishment amount.

In some embodiments, the difference threshold corresponding to the maintenance time period and the difference threshold corresponding to the gas supply restoration time period may be different.

In some embodiments, the difference threshold corresponding to the gas supply restoration time period may be preset, and the difference threshold corresponding to the maintenance time period may be correlated with a degree of stability of the maintenance time period. For example, a correspondence between "the degree of stability of the maintenance time period" and "the difference threshold of the maintenance time period" may be preset. Since the higher the degree of stability of the maintenance time period, the more reliable a gas supply in a first subperiod corresponding to the maintenance time period, the difference threshold may be appropriately smaller, i.e., "the degree of stability of the maintenance time period" and "the difference threshold of the maintenance time period" may be negatively correlated.

The degree of stability of the maintenance time period refers to a degree of stability of gas supply during the maintenance time period. Descriptions regarding determining the degree of stability of the maintenance time period may be found in FIG. 3.

In some embodiments of the present disclosure, corresponding difference thresholds may be set based on features of different time periods, so that the gas replenishment time period may be set more accurately and reasonably. By presetting the negative correlation between "the degree of stability of the maintenance time period" and "the difference threshold corresponding to the maintenance time period", a fluctuation of gas supply during the maintenance time period may be considered, the difference threshold may be set to be more realistic, and the calculation of the replenishment amount corresponding to the gas replenishment time period may be more accurate and reasonable.

Operation 253, calling backup gas from a gas storage station based on the gas replenishment amount.

In some embodiments, an amount of backup gas may be equal to the gas replenishment amount.

In some embodiments of the present disclosure, a gas replenishment time period may be determined based on the difference threshold. The gas replenishment amount may be determined through the target loss during the gas replenishment time period, to determine the replenishment parameter for the gas loss. Finally, the backup gas may be called based on the gas replenishment amount, so that the gas loss of the maintenance pipeline branch in the target time period may be reasonably assessed, and gas replenishment may be effectively performed in time.

In some embodiments, the smart gas safety management platform may also generate a plurality of candidate pressure regulation schemes, predict a gas replenishment effect through an assessment model, and determine the replenishment parameter through a preset condition. More descriptions may be found in the related descriptions in FIG. 5.

In some embodiments of the present disclosure, the target loss of the maintenance pipeline branch in the target time period may be determined through the maintenance data, the historical supply data, the historical usage data, etc., and then the replenishment parameter for the gas loss may be determined based on the target loss, so that the smart gas safety management platform may determine a subsequent gas replenishment scheme based on the degree of loss of gas shutdown or decompression supply during the maintenance of the gas pipeline network, thereby making gas management smarter, and reducing the impact of the maintenance work on normal gas supply.

Figure 3:
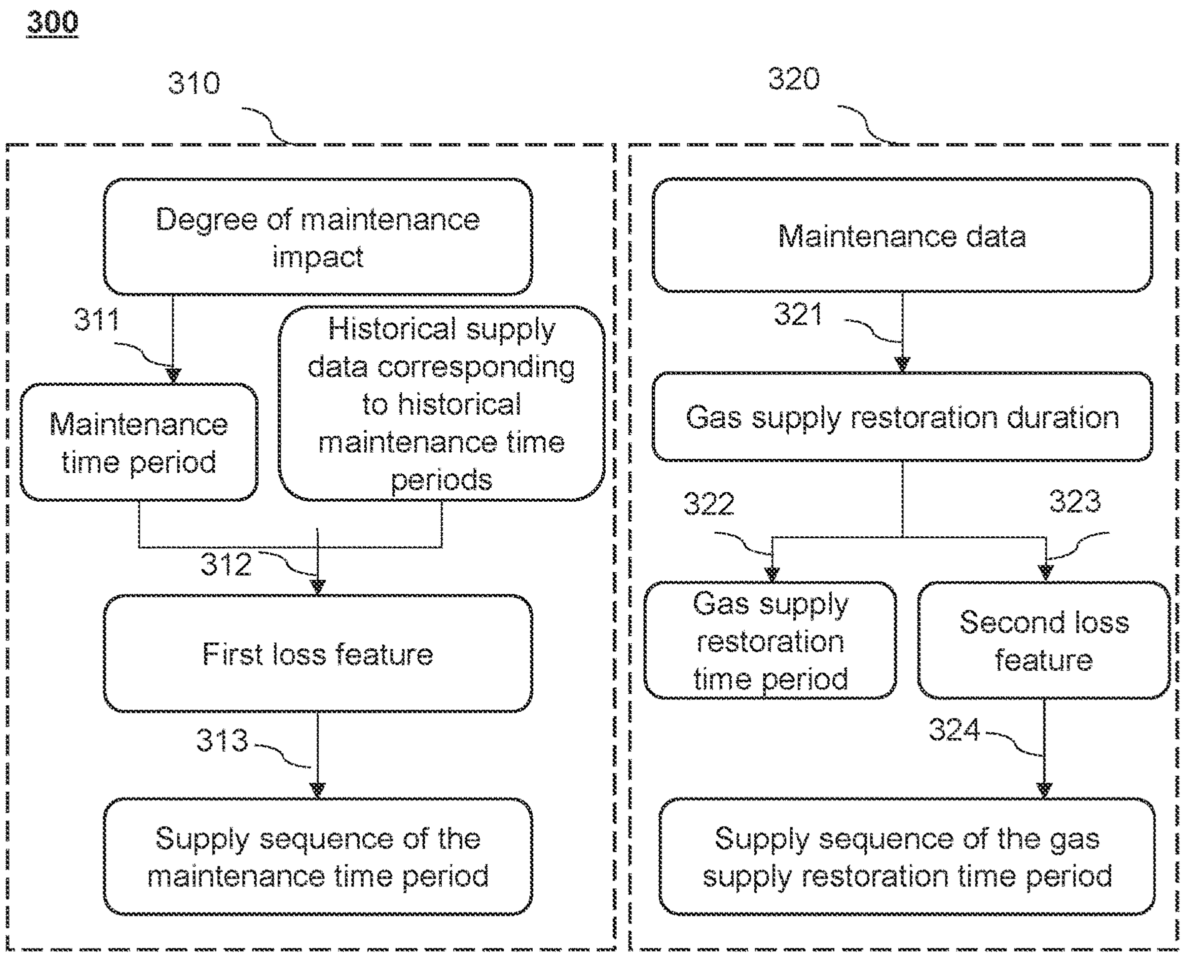
FIG. 3 is a flowchart illustrating an exemplary process for determining an amount of gas supply in a future time period according to some embodiments of the present disclosure.

FIG. 3 is a flowchart illustrating an exemplary process for determining an amount of gas supply in a future time period according to some embodiments of the present disclosure.

As illustrated in FIG. 3, in some embodiments, a smart gas safety management platform may determine a gas supply sequence during a maintenance time period by operation 310, and determine a gas supply sequence during a gas supply restoration time period by operation 320. Operation 310 may include operations 311-313, and operation 320 may include operations 321-324. Detailed descriptions of the operations may be illustrated as follows.

Operation 311, determining a maintenance time period based on a degree of a maintenance impact.

Description regarding the degree of the maintenance impact and the maintenance time period may be found in FIG. 2.

In some embodiments, the smart gas safety management platform may use a total duration taken by each maintenance process in the degree of the maintenance impact as a maintenance duration, and then obtain the maintenance time period based on a sum of a maintenance time point and the maintenance duration. For example, if the maintenance time point is 7:00 a.m. and the maintenance duration is 2 hours, the maintenance time period may be 7:00-9:00 a.m.

Operation 312, determining a first loss feature based on historical supply data of historical maintenance time periods.

Descriptions regarding the historical supply data may be found in FIG. 2.

In some embodiments, the smart gas safety management platform may obtain a plurality of sets of historical supply data corresponding to a plurality of historical maintenance time periods through a smart gas data center.

The first loss feature refers to a feature related to gas supply during the maintenance time period. In some embodiments, the first loss feature may include a gas allocation proportion sequence, a degree of stability of the gas supply during the maintenance time period, etc.

The gas allocation proportion sequence refers to a sequence formed by gas allocation proportions corresponding to a plurality of first subperiods. Descriptions regarding the first subperiods may be found in the related descriptions in FIG. 2. The gas distribution proportion refers to a ratio of an amount of gas supply of the maintenance pipeline branch to a total amount of gas supply of the pipeline network.

In some embodiments, the smart gas safety management platform may calculate the gas distribution proportion sequence based on a mathematical manner.

Merely by way of example, assuming that there are first subperiods A, B, and C, the following operations may be performed on each of the first subperiods to determine the gas distribution proportion sequence. The following is illustrated by taking the first subperiod A as an example.

1) For each set of a plurality of historical supply data in the historical maintenance time periods, historical supply data corresponding to a maintenance operation performed in the first subperiod A may be matched from a vector database. For example, if the operation performed in the first subperiod A is an operation of replacing equipment a, historical supply data corresponding to the operation of replacing the equipment a in the historical maintenance time periods may be found. The maintenance operation performed in the first subperiod A may correspond to a plurality of sets of historical supply data.
2) A unit allocation proportion corresponding to each set of the plurality of sets of historical supply data corresponding to the first subperiod A may be calculated. The unit allocation proportion refers to a gas allocation proportion per unit area of pipeline.

For example, the smart gas safety management platform may calculate the unit allocation proportion corresponding to each of the plurality of sets of historical supply data using the following formula.

$$R=S1\div S2\div d\times 100\%$$

Wherein R denotes the unit allocation proportion corresponding to a set of the plurality of sets of historical supply data; S1 denotes the amount of gas supply of the maintenance pipeline branch in the set of the plurality of sets of historical supply data, the maintenance operation performed in the maintenance pipeline branch corresponding to the maintenance operation performed in the first subperiod A; S2 denotes the total amount of gas supply of the pipeline network in the first subperiod A in the set of the plurality of sets of historical supply data; and d denotes a diameter of the maintenance pipeline branch.

Wherein S2 denotes a difference between a reading at an end time of the first subperiod A and a reading at a start time of the first subperiod A of the first metering equipment. S1 denotes a difference between a reading at an end time of the first subperiod A and a reading at a start time of the first subperiod A of the second metering equipment.

3) A weighted average for R of the plurality of sets of historical supply data corresponding to the first subperiod A may be calculated to obtain a comprehensive unit allocation proportion R'. Weights corresponding to the plurality of sets of historical supply data corresponding to the first subperiod A may be consistent with weights corresponding to first reference vectors matched with current maintenance data. Detailed descriptions may be found in the related descriptions in FIG. 2.
4) The gas allocation proportion of a current pipeline corresponding to the first subperiod A may be related to the diameter of the current pipeline branch and the comprehensive unit allocation proportion. For example, the smart gas safety management platform may calculate the gas allocation proportion of the current pipeline by the following formula: S1/S2=d*R', wherein S1/S2 denotes the gas allocation proportion corresponding to the first subperiod A.

The final gas allocation proportion sequence may be obtained as [gas allocation proportion corresponding to the first subperiod A, gas allocation proportion corresponding to the first subperiod B, gas allocation proportion corresponding to the first subperiod C].

In some embodiments, the smart gas safety management platform may calculate standard deviations of the corresponding unit allocation proportions through the plurality of sets of historical supply data corresponding to the first subperiods, and take an average value of the standard deviations of the corresponding unit allocation proportions corresponding to the first subperiods as the degree of stability of gas supply. The standard deviation may be obtained by calculating the average value of the gas allocation proportion sequence based on step 3). That is, by substituting the plurality of unit allocation proportions corresponding to the plurality of first subperiods and the average value thereof into the standard deviation calculation formula, the standard deviation of the plurality of unit allocation proportions corresponding to the plurality of first subperiods may be obtained, and the average value of the plurality of standard deviations may be further taken as the degree of stability of gas supply.

Operation 313, determining a supply sequence of a maintenance time period based on the first loss feature.

The supply sequence refers to a sequence of amounts of gas supply corresponding to different subperiods.

In some embodiments, the smart gas safety management platform may determine the supply sequence of the maintenance time period based on the following operations.

1) Historical supply data of a maintenance pipeline in normal operation in a recent historical time period may be obtained, and a first reference amount of gas supply of the maintenance pipeline corresponding to each of the first subperiods of the maintenance time period may be determined.

The first reference amount of gas supply is a total amount of gas that should actually be supplied throughout the pipeline network in the corresponding first subperiod in the normal operation of the maintenance pipeline at a pressure allocated by an original pressure regulation station.

2) The first reference amount of gas supply of the maintenance pipeline corresponding to each of the first subperiods and the gas allocation proportion of the first subperiod A may be positively correlated with a second reference amount of gas supply of the first subperiod A. For example, the second reference amount of gas supply corresponding to the first subperiod A may be calculated by the following formula.

The second reference amount of gas supply a corresponding to the first subperiod A=the first reference amount of gas supply corresponding to the first subperiod A×the gas allocation proportion corresponding to the first subperiod A.

The second reference amount of gas supply refers to an estimated amount of gas supply that may be achieved by the maintenance pipeline branch corresponding to the first subperiod when the pipeline maintenance is in progress. In this example, the second reference amounts of gas supply corresponding to the first subperiods A, B, and C may be denoted as a, b, and c, respectively.

3) The gas supply sequence during the maintenance time period after the calculation of the second reference amounts of gas supply corresponding to all the first subperiods is completed may be denoted as [a, b, c].

Operation 321, predicting a gas supply restoration duration based on maintenance data.

In some embodiments, the smart gas safety management platform may predict the gas supply restoration duration based on the maintenance data in various ways. For example, the smart gas safety management platform may construct a third predetermined table based on the maintenance data and the gas supply restoration duration in the historical data, and predict the gas supply restoration duration by querying the table. The maintenance data may include different ranges or types. For example, different ranges may include different community ranges, urban regions, etc., and different types may include an equipment replacement type, a maintenance type, etc. Different ranges or types may correspond to different gas supply restoration durations.

In some embodiments, the smart gas safety management platform may also predict the gas supply restoration duration based on the maintenance data, a pipeline network design map, and reference gas delivery information through a machine learning model. The related descriptions may be found in FIG. 4.

Operation 322, determining a gas supply restoration time period based on the gas supply restoration duration.

In some embodiments, the smart gas safety management platform may obtain the gas supply restoration time period by adding the gas supply restoration duration to the maintenance time period. For example, the maintenance time period obtained previously may be 7:00-9:00 a.m. Assuming that the gas supply restoration duration is 1 hour, the gas supply restoration time period may be 9:00-10:00 a.m.

Operation 323, determining a second loss feature based on the gas supply restoration duration.

The second loss feature refers to a feature related gas supply during the gas supply restoration time period. In some embodiments, the second loss feature may be characterized by a gas restoration degree sequence.

The gas restoration degree sequence refers to a sequence composed of a ratio of the amount of gas supply corresponding to each of the second subperiods of the maintenance time period to the amount of gas supply corresponding to the last first subperiod.

In some embodiments, the smart gas safety management platform may determine the gas restoration degree sequence based on the following manner for each of a plurality of sets of historical supply data corresponding to historical gas supply restoration time periods.

1) A plurality of historical second subperiods may be obtained by dividing the gas supply restoration duration corresponding to the historical supply data of the set of gas supply restoration time period based on a second division manner, and then the amount of gas supply corresponding to each of historical second subperiods may be statistically counted based on each set of historical supply data. The amount of gas supply corresponding to each of historical second subperiods refers to a difference between a reading of the second metering equipment of the maintenance pipeline branch at an end time and a start moment of the historical second subperiod.

2) In the historical supply data corresponding to the gas supply restoration time period, a gas supply reference curve may be plotted based on the amount of gas supply of the maintenance pipeline branch corresponding to the last first subperiod of the gas supply restoration time period and the amount of gas supply corresponding to each historical second subperiod. A horizontal coordinate denotes the time period, and vertical coordinate denotes the amount of gas supply. Each subperiod may correspond to an amount of gas supply. Coordinates composed of each subperiod and the amount of gas supply corresponding to each subperiod may correspond to a point. The gas supply reference curve may be composed of a plurality of points sequentially connected.

A comprehensive supply reference curve may be obtained by fitting a plurality of gas supply reference curves corresponding to the plurality of sets of historical supply data. A fitting approach may include a least squares manner, a polynomial fitting manner, or the like. The amount of gas supply (e.g., Y2, Y3, and Y4) corresponding to each second subperiod and the amount of gas supply Y1 corresponding to the last first subperiod of the maintenance time period may be extracted from the comprehensive supply reference curve. A sequence formed based on time periods may be the gas restoration degree sequence. Since the ratio may be simplified, assuming that Y1-Y4 are simplified to X1-X4 based on their greatest common divisor, the final gas restoration degree sequence may be expressed as (X1:X2:X3:X4), wherein X1, X2, X3, and X4 refer to a ratio of the amount of gas supply corresponding to the last first subperiod of the maintenance time period to the amount of gas supply corresponding to each second subperiod, respectively.

Operation 324, determining a supply sequence of the gas supply restoration time period based on the second loss feature.

In some embodiments, the smart gas safety management platform may obtain third reference amounts of gas supply corresponding to the plurality of second subperiods based on a positive correlation between a second reference amount of gas supply corresponding to the last first subperiod in the supply sequence during the maintenance time period, the gas restoration degree sequence, and the third reference amounts of gas supply corresponding to the plurality of second subperiods.

For example, the smart gas safety management platform may determine the supply sequence of the gas supply restoration time period in the following manner. A second reference amount of gas supply (denoted as m) corresponding to the last first subperiod in the supply sequence of the maintenance time period may be obtained, and third reference amounts of gas supply d, e, and f corresponding to a plurality of subsequent second subperiods (assumed to be D, E, and F) may be calculated based on the gas restoration degree sequence (X1:X2:X3:X4). The third reference amount of gas supply refers to an estimated amount of gas supply that may be achieved by the maintenance pipeline branch in each second subperiod when the gas supply is restored.

For example, a ratio corresponding to the second reference amount of gas supply m may be X1.

The third reference amount of gas supply corresponding to the second subperiod D may be d ($m \div X1 \times X2$).

The third reference amount of gas supply corresponding to the second subperiod E may be e ($m \div X1 \times X3$).

The third reference amount of gas supply corresponding to the second subperiod F may be f ($m \div X1 \times X4$).

The final supply sequence of the gas supply restoration time period may be [d, e, f].

In some embodiments of the present disclosure, by dividing the maintenance time period and the gas supply restoration time period, and by dividing the subperiods based on the features of different time periods and comprehensively determining the supply sequences corresponding to different time periods based on the related data and features of the subperiods, the first loss feature and the second loss feature of each time period may be effectively combined through the historical data to determine the corresponding supply sequence, so that the determination of the sequence may be more in line with the actual situation.

It should be noted that the foregoing descriptions of the processes 200 and 300 are for the purpose of exemplary illustration only and do not limit the scope of application of the present disclosure. For those skilled in the art, various corrections and changes may be made to the processes 200 and 300 under the guidance of the present disclosure.

Figure 4:
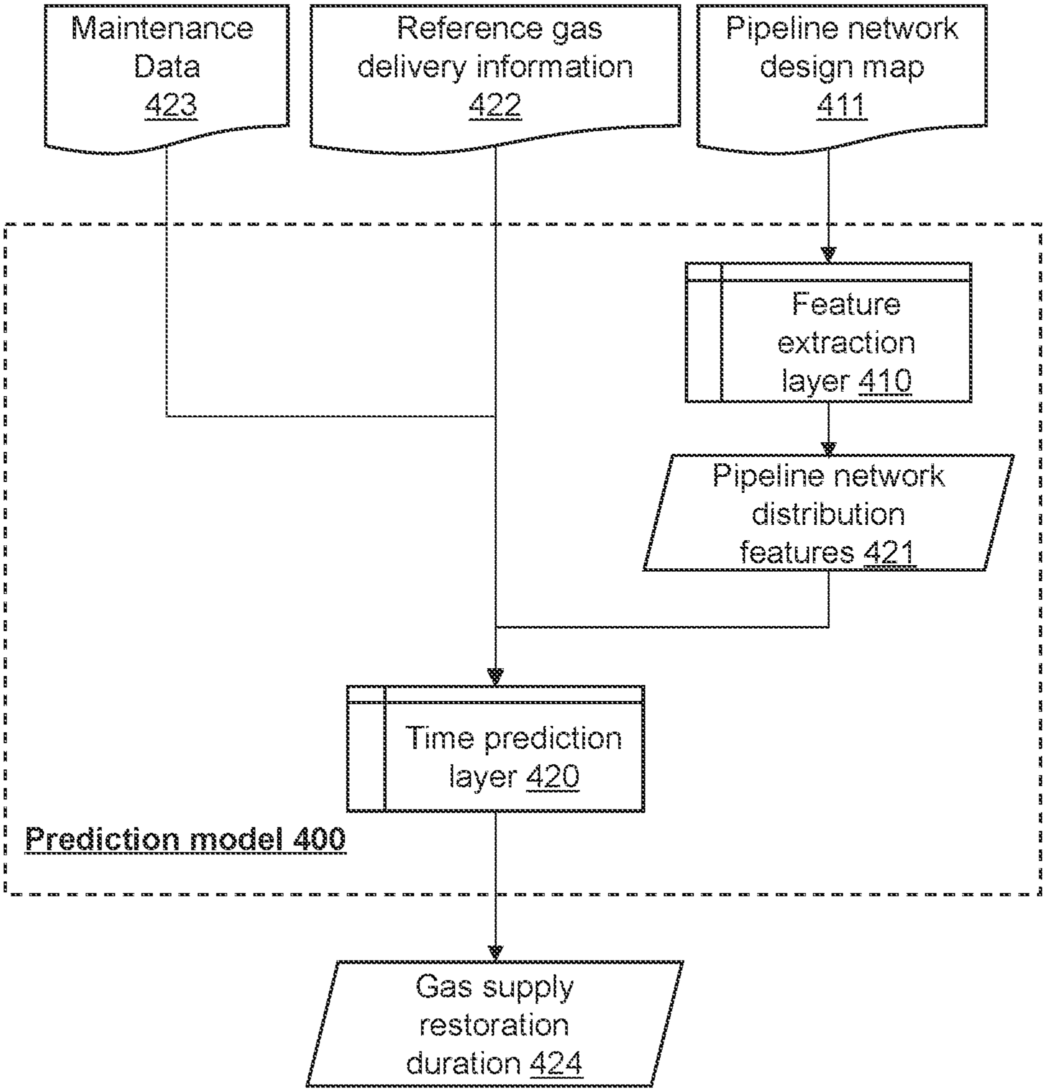
FIG. 4 is a schematic diagram illustrating a prediction model according to some embodiments of the present disclosure.

FIG. 4 is a schematic diagram illustrating a prediction model according to some embodiments of the present disclosure.

In some embodiments, a processor may predict a gas supply restoration duration 424 through a prediction model 400 based on maintenance data 423, a pipeline network design map 411, and reference gas delivery information 422. The prediction model 400 may be a machine learning model.

In some embodiments, the prediction model 400 may be any one of a neural networks (NN) model, a convolutional neural network (CNN) model, other customized model structure, or the like, or any combination thereof. In some embodiments, as illustrated in FIG. 4, the prediction model 400 may include a feature extraction layer 410 and a time prediction layer 420.

In some embodiments, an input of the feature extraction layer 410 may include the pipeline network design map 411, and an output of the feature extraction layer 410 may include pipeline network distribution features 421. In some embodiments, the feature extraction layer 410 may include the CNN model.

The pipeline network design map 411 refers to data related to the design of a gas pipeline network. For example, the pipe network design map 411 may include a distribution position of the gas pipeline network, diameter of gas pipelines, lengths of the gas pipelines, a distance between the gas pipelines, gas pipeline connection relationships, or the like. In some embodiments, the pipeline network design map 411 may be obtained in advance.

The pipeline network distribution features 421 refer to a distribution of the gas pipeline network. For example, the pipeline network distribution features 421 may include a distribution position and a connection relationship of a maintenance pipeline branches.

In some embodiments, an input of the time prediction layer 420 may include the pipeline network distribution features 421, the maintenance data 423, and the reference gas delivery information 422, and an output of the time prediction layer 420 may include the gas supply restoration duration 424. Description regarding the maintenance data 423 and the reference gas delivery information 422 may be found in the related descriptions in FIG. 2. In some embodiments, the time prediction layer 420 may be a neural network model.

In some embodiments, the output of the feature extraction layer 410 may be the input of the time prediction layer 420. The feature extraction layer 410 and the time prediction layer 420 may be obtained through joint training. In some embodiments, sample data for the joint training may include sample pipeline network design maps of the gas pipeline network, sample maintenance data, and sample reference gas delivery information. Labels may be adjusted historical gas supply restoration durations corresponding to the sample data. Sample pipeline network distribution features output by the feature extraction layer 410 may be obtained by inputting the sample pipeline network design map into the feature extraction layer 410; and the gas supply restoration duration output by the time prediction layer 420 may be obtained by inputting the sample pipeline network distribution features as the training sample data, the sample maintenance data, and the sample reference gas delivery information into the time prediction layer 420. A loss function may be constructed based on the labels and the gas supply restoration duration output by the time prediction layer 420, and parameters of the feature extraction layer 410 and the time prediction layer 420 may be synchronously updated. The trained feature extraction layer 410 and the trained time prediction layer 420 may be obtained by parameter update.

In some embodiments, the obtaining the adjusted historical gas supply restoration durations may include the following operations. Historical gas supply restoration durations of historical maintenance pipeline branches may be obtained, the historical gas supply restoration durations may be adjusted, and the adjusted historical gas supply restoration durations may be used as the labels of training the time prediction layer 420. The manner of obtaining the historical gas supply restoration durations of the historical maintenance pipeline branches may be may be found in the related descriptions in FIG. 2.

In some embodiments, the processor may adjust the historical gas supply restoration durations based on an adjustment factor.

In some embodiments, the formula for the adjusted historical gas supply restoration durations may be represented by:

$$M' = \varphi M \quad (1)$$

In the formula (1), M' denotes the adjusted historical gas supply restoration durations, and M denotes the historical gas supply restoration durations before adjustment. The historical gas supply restoration durations before adjustment may be obtained based on the historical data stored in a storage.

φ denotes the adjustment factor. In some embodiments, the adjustment factor refers to a confidence level of collection equipment corresponding to historical gas delivery information. The historical gas delivery information refers to historical information related to gas delivery, such as historical gas flow rates, historical operation temperatures, historical operation pressures, or the like.

In some embodiments, the historical gas delivery information may be obtained from the smart gas equipment object sub-platform or the smart gas data center 132 based on the historical data. The confidence level of the collection equipment refers to a degree of accuracy of information collected by the collection equipment. In some embodiments, the confidence level of the collection equipment may be correlated with a sensitivity, a usage time, and a maintenance record of the collection device. For example, the higher the sensitivity, the shorter the usage time, and the fewer the maintenance record of the collection equipment, the higher the confidence level of the collection equipment, and the higher the adjustment factor. In some embodiments, the sensitivity, the usage time, and the maintenance record of the collection equipment may be obtained from the smart gas equipment object sub-platform or the smart gas data center 132 based on the historical data.

In some embodiments of the present disclosure, the gas supply restoration duration 424 may be accurately predicted based on the maintenance data 423, the pipeline network design map 411, and the reference gas delivery information 422 by using the prediction model 400. In some embodiments of the present disclosure, accurate second labels may be obtained by adjusting the historical gas supply restoration durations based on the adjustment factor, so that a training result of the time prediction layer 420 may be better, which in turn enables the trained prediction model 400 to more accurately predict the gas supply restoration duration.

Figure 5:
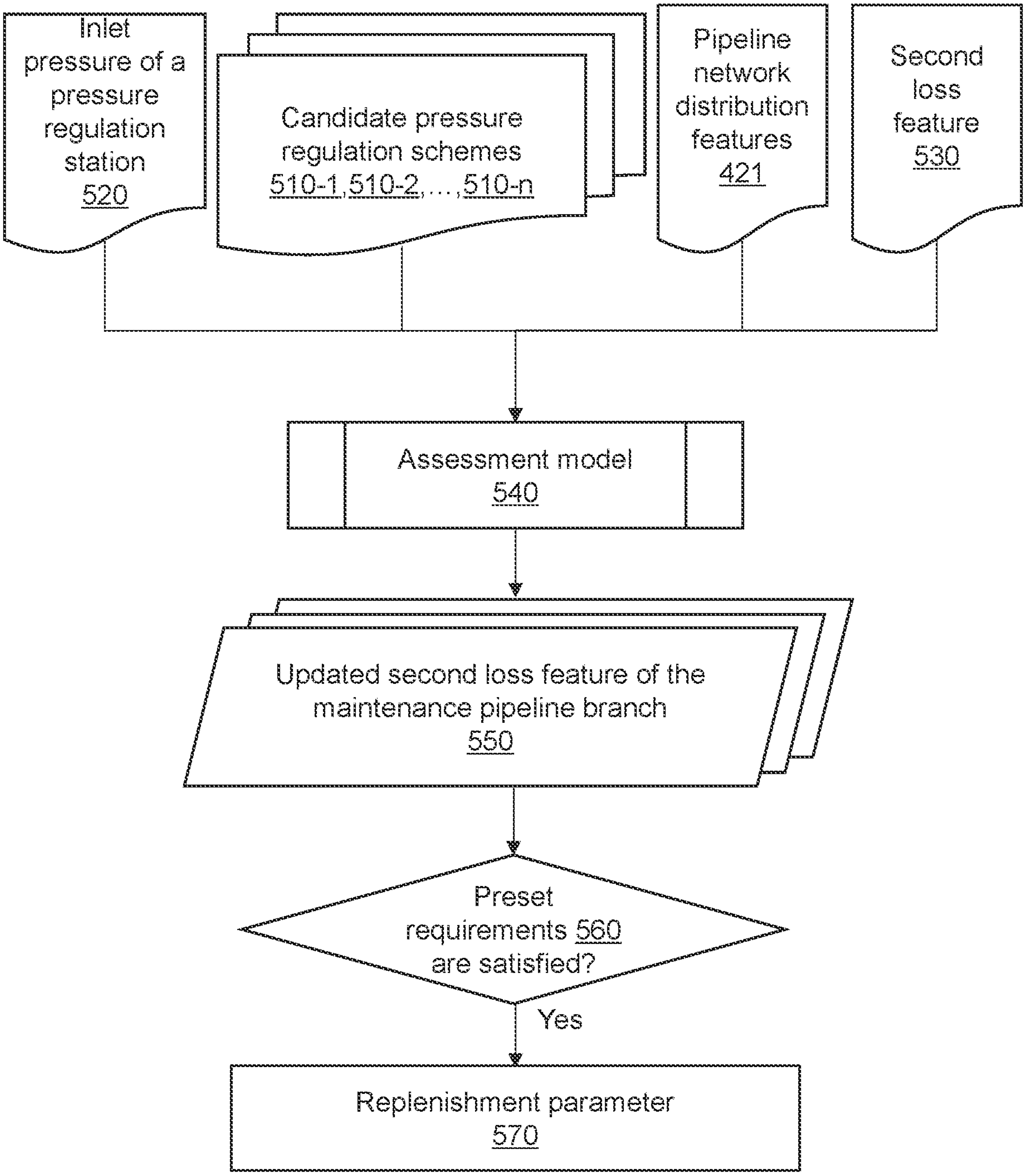
FIG. 5 is a schematic diagram illustrating an exemplary process for determining a replenishment parameter according to some embodiments of the present disclosure.

FIG. 5 is a schematic diagram illustrating an exemplary process for determining a replenishment parameter according to some embodiments of the present disclosure.

In some embodiments, when a gas replenishment time period is within an entire gas supply restoration time period, a smart gas safety management platform may generate a plurality of candidate pressure regulation schemes, such as the candidate pressure regulation schemes 510-1, 510-2, . . . , **510-*n*, and predict gas replenishment effects corresponding to the candidate pressure regulation schemes, and then determine a replenishment parameter 570 based on satisfying preset requirements 560**.

The candidate pressure regulation schemes refer to candidate pressure regulation schemes for gas pipelines. For example, the candidate pressure regulation schemes may include a proportion of pressure allocated to each gas pipeline branch by a gas pressure regulation station. The proportion of pressure allocated to each gas pipeline branch refers to a proportion of the pressure allocated to the gas pipeline branch to a sum of pressures of all gas pipeline branches.

In some embodiments, the smart gas safety management platform may generate the candidate pressure regulation schemes based on a predetermined manner. For example, if the proportion of pressure allocated to a certain maintenance pipeline branch needs to be increased through the gas pressure regulation station, the proportion of pressure allocated to the maintenance pipeline branch may be randomly increased by at least one unit (e.g., 1%) within a range of a preset proportion of pressure allocated to the maintenance pipeline branch in a normal condition, and the remaining pressure may be allocated based on proportions of pressures of other gas pipelines. The range of the preset proportion of pressure may be set by a technician based on priori knowledge and experience.

In some embodiments, the smart gas safety management platform may allocate a pressure of the pressure regulation station based on a degree of importance of a gas user of the gas pipeline branch. In some embodiments, the degree of importance of the gas user may be positively correlated with the proportion of pressure. For example, the higher the degree of importance of the gas user, the higher the proportion of pressure of the gas pipeline corresponding to the gas user, but the proportion of pressure of the gas pipeline may not be higher than an upper limit of a range of the proportion of pressure of the gas pipeline.

In some embodiments, the degree of importance of the gas user may be determined based on previous gas usage of the gas user. For example, the higher a frequency of gas usage of the gas user, the higher the degree of importance of the gas user.

In some embodiments of the present disclosure, by adjusting the proportion of pressure of the gas pressure regulation station based on the degree of importance of the gas user, the pressure regulation schemes can be both comprehensive and targeted, the gas supply of important gas users can be better guaranteed, and gas resources can be reasonably allocated.

In some embodiments, the upper limit of the range of the proportion of pressure may be correlated with a pressure bearing capacity of the maintenance pipeline branch. For example, the higher the pressure bearing capacity of the maintenance pipeline branch, the higher the upper limit of the range of the proportion of pressure. The pressure bearing capacity of the maintenance pipeline branch may be determined based on factory parameters, historical usage, and the maintenance data of the pipeline. For example, the higher the factory pressure bearing performance of the pipeline, the shorter the historical usage time, and the lower the count of maintenance, the higher the pressure bearing capacity of the maintenance pipeline branch.

In some embodiments, if the pressure bearing capacity of the maintenance pipeline branch is low, allocating too high a pressure may be counterproductive and cause the maintenance gas pipeline branch to malfunction again. Accordingly, by setting the upper limit of the range of the proportion of pressure based on the pressure bearing capacity of the maintenance pipeline branch, the risk of re-failure of the maintenance gas pipeline branch may be reduced, so that the pressure regulation schemes may be within a reasonable range.

In some embodiments, the smart gas safety management platform may further process an updated second loss feature of the maintenance pipeline branch output by the assessment model to obtain a supply sequence of the maintenance pipeline branch during the gas supply restoration time period as a gas replenishment effect. More descriptions regarding the second loss feature and determining the gas supply sequence of the gas supply restoration time period may be found in the related descriptions in FIG. 3. The updating of the second loss feature may be understood as a restoration of gas in the gas pipeline under the pressure allocation proportions of the candidate pressure regulation schemes at the end of the maintenance of the gas pipeline after the candidate pressure regulation schemes are adopted.

In some embodiments, the smart gas safety management platform may predict an updated second loss feature 550 of the maintenance pipeline branch based on an assessment model 540. In some embodiments, the assessment model 540 may be a machine learning model, such as a CNN model, a graph neural network (GNN) model, etc.

In some embodiments, an input of the assessment model 540 may include an inlet pressure 520 of a pressure regulation station, one of candidate pressure regulation schemes (e.g., a candidate pressure regulation scheme 510-1), the pipeline network distribution features 421, and a second loss feature 530, and an output of the assessment model 540 may include the updated second loss feature of the maintenance pipeline branch. The inlet pressure 520 of the pressure regulation station may be obtained by pressure monitoring equipment at a pipeline inlet, and the pipeline network distribution features may be obtained by the prediction model of FIG. 4. Detailed descriptions may be found in the related descriptions in FIG. 4.

In some embodiments, the assessment model 540 may be obtained by training. In some embodiments, second training samples may include the inlet pressure of the pressure regulation station, the pressure regulation schemes, the pipeline network distribution features, and the second loss feature in historical data. Second labels may be obtained by the following operations.

1) a set of second metering equipment data corresponding to the gas supply restoration time period after historical pressure regulation schemes X, Y, and Z are executed, the set of second metering equipment data including a reading of a second metering equipment and performance parameters of the second metering equipment, and the historical pressure regulation schemes X, Y, and Z corresponding to each set of second metering equipment data, respectively. The performance parameters of the second metering equipment may be configured to reflect whether an operation of the second metering equipment is reliable. The performance parameters may mainly include a response time, a power consumption, and a data updating rate. The performance parameters of the second metering equipment may be obtained by consulting an instruction manual of the second metering equipment.
2) Whether each set of reading of the second metering equipment is reliable may be determined based on the performance parameters of the second metering equipment.

In some embodiments, the smart gas safety management platform may construct vectors based on the [performance parameters of the second metering equipment] corresponding to the set of reading of the second metering equipment and [performance parameters of a standard metering equipment], respectively, and calculate a similarity of two vectors. If the similarity is higher than a similarity threshold, the set of reading of the second metering equipment may be reliable; or if the similarity is lower than the similarity threshold, the set of reading of the second metering equipment may be unreliable. The manner of calculating the similarity may be to calculate a Euclidean distance, a cosine distance, etc., of the two vectors as described above. The threshold may be manually preset based on experience.

3) The unreliable reading of the second metering equipment may be excluded, historical second loss features of corresponding historical pressure regulation schemes may be calculated based on the reliable reading of the second metering equipment, and the historical second loss features may be used as the second labels. The manner of calculating the historical second loss features may be found in the manner of calculating the second loss feature in FIG. 3.

In some embodiments of the present disclosure, by assessing the gas replenishment effects of different candidate pressure regulation schemes based on the inlet pressure 520 of the pressure regulation station, the pipeline network distribution features 421, and the second loss feature 530 using the assessment model 540, the assessment of the gas replenishment effects can be more comprehensive. Meanwhile, the model may be trained using the historical data, thereby improving the accuracy of the model, and facilitating subsequent determination of the replenishment parameter of the gas loss based on the preset requirements.

In some embodiments, the smart gas safety management platform may update the second loss feature of the maintenance pipeline branch based on the candidate pressure regulation schemes 510, and determine an updated supply sequence of the gas supply restoration time period based on the updated second loss feature of the maintenance pipeline branch. Detailed descriptions may be found in the related descriptions in FIG. 3.

The target loss corresponding to each gas replenishment time period may be calculated using the gas supplies and the gas demands of the maintenance pipeline branch corresponding to the plurality of gas replenishment time periods in the gas supply sequence. The calculation approach may be found in the related descriptions in FIG. 2.

If the target loss corresponding to each gas replenishment time period is less than a difference threshold, i.e., the preset requirements 560 are satisfied, the replenishment parameter for the gas loss may be determined based on the candidate pressure regulation schemes 570.

In some embodiments of the present disclosure, by generating the plurality of candidate pressure regulation schemes, and then assessing the gas replenishment effects of the plurality of the candidate pressure regulation schemes based on the inlet pressure of the pressure regulation station, the pipeline network distribution features, and the second loss feature, and finally determining the final replenishment parameter based on the gas replenishment effects and the preset requirements, the determined replenishment parameter can be more in line with the actual situation. The proportion of pressure is adjusted instead of a pressure value in the pressure regulation schemes because the total pressure is variable based on the operation principle of the gas pressure regulation station and can be adjusted and controlled as needed, and the proportion of pressure is a decision factor of the gas supply. Therefore, it is more realistic and effective to set up the pressure regulation schemes to adjust the proportion of pressure for the distribution of the gas pipeline branch.

It should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for assessing a loss of a maintenance medium of a smart gas pipeline network, implemented based on a smart gas safety management platform of an Internet of Things (IOT) system for assessing a loss of a maintenance medium of a smart gas pipeline network, the loT system further comprising a smart gas user platform, a smart gas service platform, a smart gas sensor network platform, and a smart gas object platform; wherein the smart gas user platform is configured as a terminal device, the smart gas safety management platform includes a smart gas emergency maintenance management sub-platform and a smart gas data center, the smart gas data center is configured as storage equipment, the smart gas object platform includes a smart gas equipment object sub-platform and a smart gas maintenance engineering object sub-platform, the smart gas equipment object sub-platform is configured as various types of gas equipment and monitoring equipment, the gas equipment includes gas pipeline network, valve control equipment, and gas storage tanks, the monitoring equipment includes gas flowmeters, pressure sensors, and temperature sensors, the smart gas maintenance engineering object sub-platform at least includes hand-held terminals of maintenance persons and maintenance equipment, the method comprising:

determining a degree of a maintenance impact based on maintenance data;

wherein the maintenance data refers to data related to a maintenance pipeline, the maintenance data includes a maintenance time point, a maintenance type, a maintenance process, and information of a maintenance person; and the degree of the maintenance impact refers to a relevant indicator reflecting a degree of impact caused by maintenance on gas supply, the degree of the maintenance impact includes time consumption for each maintenance process, a gas supply restoration duration, and a degree of maintenance shutdown and decompression;

determining a target supply for a maintenance pipeline branch in a target time period based on the degree of the maintenance impact and historical supply data;

determining a target demand for the maintenance pipeline branch in the target time period based on historical usage data;

determining a target loss in the target time period based on the target supply and the target demand; and determining a replenishment parameter of a gas loss based on the target loss;

wherein the replenishment parameter includes a gas replenishment time period and a gas replenishment amount corresponding to the gas replenishment time period, and the determining the replenishment parameter of the gas loss based on the target loss includes:

in response to a determination that the target loss in the target time period is greater than a difference threshold, determining the target time period as the gas replenishment time period;

determining the gas replenishment amount based on the target loss corresponding to the gas replenishment time period and the difference threshold; and calling backup gas from a gas storage station based on the gas replenishment amount;

wherein the target time period includes a maintenance time period and a gas supply restoration time period, and the determining a target supply for a maintenance pipeline branch in a target time period based on the degree of the maintenance impact and historical supply data includes:

determining the maintenance time period based on the degree of the maintenance impact;

determining a first loss feature based on historical supply data of a historical maintenance time period; wherein first loss feature refers to a feature related to gas supply during the maintenance time period, and the first loss feature includes a gas allocation proportion sequence, and a degree of stability of the gas supply during the maintenance time period;

determining a supply sequence of the maintenance time period based on the first loss feature;

predicting the gas supply restoration duration through a prediction model based on the maintenance data, a pipeline network design map, and reference gas delivery information, wherein the prediction model is a machine learning model; wherein the prediction model includes a feature extraction layer and a time prediction layer; the feature extraction layer includes a CNN model, an input of the feature extraction layer includes the pipeline network design map, and an output of the feature extraction layer includes pipeline network distribution features; the time prediction layer includes a neural network model, an input of the time prediction layer includes the pipeline network distribution features, the maintenance data, and the reference gas delivery information, and an output of the time prediction layer includes the gas supply restoration duration;

the feature extraction layer and the time prediction layer are obtained through joint training based on training samples and labels, the training samples include sample pipeline network design map of the gas pipeline network, sample maintenance data, and sample reference gas delivery information, the labels are adjusted historical gas supply restoration durations corresponding to the training samples; and the joint training includes: inputting the sample pipeline network design map into an initial feature extraction layer to obtain a sample pipeline network distribution feature output by the initial feature extraction layer; inputting the sample pipeline network distribution feature, the sample maintenance data, and the sample reference gas delivery information into an initial time prediction layer to obtain sample gas supply restoration duration output by the initial time prediction layer; constructing a loss function base on the labels and the sample gas supply restoration duration; updating parameters of the initial feature extraction layer and the initial time prediction layer synchronously; and obtaining the feature extraction layer and the time prediction layer;

determining the gas supply restoration time period based on the gas supply restoration duration;

determining a second loss feature based on the gas supply restoration duration; wherein the second loss feature refers to a feature related gas supply during the gas supply restoration time period; and determining a supply sequence of the gas supply restoration time period based on the second loss feature.

2. The method according to claim 1, wherein the target time period includes a maintenance time period and a gas supply restoration time period, and the determining a target supply for a maintenance pipeline branch in a target time period based on the degree of the maintenance impact and historical supply data includes:

determining the maintenance time period based on the degree of the maintenance impact;

determining a first loss feature based on historical supply data of historical maintenance time periods; wherein first loss feature refers to a feature related to gas supply during the maintenance time period, and the first loss feature includes a gas allocation proportion sequence, and a degree of stability of the gas supply during the maintenance time period;

determining a supply sequence of the maintenance time period based on the first loss feature;

predicting a gas supply restoration duration based on the maintenance data;

determining the gas supply restoration time period based on the gas supply restoration duration;

determining a second loss feature based on the gas supply restoration duration;

wherein the second loss feature refers to a feature related gas supply during the gas supply restoration time period; and determining a supply sequence of the gas supply restoration time period based on the second loss feature.

3. The method according to claim 1, wherein the determining the gas replenishment amount based on the target loss in the gas replenishment time period and the difference threshold includes:

in response to a determination that the gas replenishment time period is completely within a gas supply restoration time period, generating a candidate pressure regulation scheme based on a predetermined manner, the candidate pressure regulation scheme including a proportion of pressure allocated to a gas pipeline branch by a gas regulation station;

predicting a gas replenishment effect of the candidate pressure regulation scheme; and in response to a determination that the gas replenishment effect satisfies predetermined requirements, determining the replenishment parameter based on the candidate pressure regulation scheme.

4. The method according to claim 3, wherein a pressure of the gas regulation station is allocated based on a degree of importance of a gas user of the gas pipeline branch, and the degree of importance is positively related to the proportion of pressure.

5. The method according to claim 3, wherein an upper limit of the proportion of pressure is related to a pressure bearing capacity of the maintenance pipeline branch.

6. The method according to claim 3, wherein the gas replenishment effect includes a supply sequence of the gas supply restoration time period, the supply sequence of the gas supply restoration time period is determined based on an updated second loss feature of the maintenance pipeline branch, and the predicting the gas replenishment effect of the candidate pressure regulation scheme includes:

predicting the updated second loss feature of the maintenance pipeline branch by processing the candidate pressure regulation scheme, an inlet pressure of the pressure regulation station, a pipeline network distribution feature, and a second loss feature through an assessment model, the assessment model being a machine learning model; wherein the assessment model is obtained by training based on second training samples with second labels, the second training samples include the inlet pressure of the pressure regulation station, the pressure regulation schemes, the pipeline network distribution features, and the second loss feature in historical data, the second labels are obtained by following operations:

obtaining a set of second metering equipment data corresponding to the gas supply restoration time period after historical pressure regulation schemes are executed, the set of second metering equipment data including a reading of a second metering equipment and performance parameters of the second metering equipment, and the historical pressure regulation schemes corresponding to each set of second metering equipment data, respectively;

determining whether each set of reading of the second metering equipment is reliable based on the performance parameters of the second metering equipment;

excluding unreliable reading of the second metering equipment, and calculating historical second loss features of corresponding historical pressure regulation schemes based on the reliable reading of the second metering equipment, and using the historical second loss features as the second labels.

7. The method according to claim 1, wherein difference thresholds corresponding to the maintenance time period and the gas supply restoration time period are different, and the difference threshold corresponding to the maintenance time period is related to a degree of stability of the gas supply during the maintenance time period.

8. An internet of things (IoT) system for assessing a loss of a maintenance medium of a smart gas pipeline network, comprising a smart gas user platform, a smart gas service platform, a smart gas safety management platform, a smart gas sensor network platform, and a smart gas object platform; wherein the smart gas user platform is configured as a terminal device, the smart gas safety management platform includes a smart gas emergency maintenance management sub-platform and a smart gas data center, the smart gas data center is configured as storage equipment, the smart gas object platform includes a smart gas equipment object sub-platform and a smart gas maintenance engineering object sub-platform, the smart gas equipment object sub-platform is configured as various types of gas equipment and monitoring equipment, the gas equipment includes gas pipeline network, valve control equipment, and gas storage tanks, the monitoring equipment includes gas flowmeters, pressure sensors, and temperature sensors, and the smart gas maintenance engineering object sub-platform at least includes hand-held terminals of maintenance persons and maintenance equipment; wherein the smart gas safety management platform is configured to:

determine a degree of a maintenance impact based on maintenance data;

wherein the maintenance data refers to data related to a maintenance pipeline, the maintenance data includes a maintenance time point, a maintenance type, a maintenance process, and information of a maintenance person; and the degree of the maintenance impact refers to a relevant indicator reflecting a degree of impact caused by maintenance on gas supply, the degree of the maintenance impact includes time consumption for each maintenance process, a gas supply restoration duration, and a degree of maintenance shutdown and decompression; the maintenance data being obtained from the smart gas object platform through the smart gas sensor network platform;

determine a target supply for a maintenance pipeline branch in a target time period based on the degree of the maintenance impact and historical supply data;

determine a target demand for the maintenance pipeline branch in the target time period based on historical usage data, the historical usage data being obtained from the smart gas object platform through the smart gas sensor network platform;

determine a target loss in the target time period based on the target supply and the target demand; and determine a replenishment parameter of gas loss based on the target loss;

wherein the replenishment parameter includes a gas replenishment time period and a gas replenishment amount corresponding to the gas replenishment time period, the replenishment parameter being transmitted to the smart gas object platform through the smart gas sensor network platform; and the smart gas safety management platform is further configured to:

in response to a determination that the target loss in the target time period is greater than a difference threshold, determine the target time period as the gas replenishment time period;

determine the gas replenishment amount based on the target loss corresponding to the gas replenishment time period and the difference threshold; and call backup gas from a gas storage station based on the gas replenishment amount:

wherein the target time period includes a maintenance time period and a gas supply restoration time period, and the smart gas safety management platform is further configured to:

determine the maintenance time period based on the degree of the maintenance impact;

determine a first loss feature based on historical supply data of a historical maintenance time period; wherein first loss feature refers to a feature related to gas supply during the maintenance time period, and the first loss feature includes a gas allocation proportion sequence, and a degree of stability of the gas supply during the maintenance time period;

determine a supply sequence of the maintenance time period based on the first loss feature;

predict the gas supply restoration duration through a prediction model based on the maintenance data, a pipeline network design map, and reference gas delivery information, wherein the prediction model is a machine learning model; wherein the prediction model includes a feature extraction layer and a time prediction layer; the feature extraction layer includes a CNN model, an input of the feature extraction layer includes the pipeline network design map, and an output of the feature extraction layer includes pipeline network distribution features; the time prediction layer includes a neural network model, an input of the time prediction layer includes the pipeline network distribution features, the maintenance data, and the reference gas delivery information, and an output of the time prediction layer includes the gas supply restoration duration;

the feature extraction layer and the time prediction layer are obtained through joint training based on training samples and labels, the training samples include sample pipeline network design map of the gas pipeline network, sample maintenance data, and sample reference gas delivery information, the labels are adjusted historical gas supply restoration durations corresponding to the training samples; and the joint training includes: inputting the sample pipeline network design map into an initial feature extraction layer to obtain a sample pipeline network distribution feature output by the initial feature extraction layer; inputting the sample pipeline network distribution feature, the sample maintenance data, and the sample reference gas delivery information into an initial time prediction layer to obtain sample gas supply restoration duration output by the initial time prediction layer; constructing a loss function base on the labels and the sample gas supply restoration duration; updating parameters of the initial feature extraction layer and the initial time prediction layer synchronously; and obtaining the feature extraction layer and the time prediction layer;

predict a gas supply restoration duration based on the maintenance data;

determine the gas supply restoration time period based on the gas supply restoration duration;

determine a second loss feature based on the gas supply restoration duration; wherein the second loss feature refers to a feature related gas supply during the gas supply restoration time period; and determine a supply sequence of the gas supply restoration time period based on the second loss feature.

9. The IoT system according to claim 8, wherein the target time period includes a maintenance time period and a gas supply restoration time period, and the smart gas safety management platform is further configured to:

determine the maintenance time period based on the degree of the maintenance impact;

determine a first loss feature based on historical supply data of historical maintenance time periods; wherein first loss feature refers to a feature related to gas supply during the maintenance time period, and the first loss feature includes a gas allocation proportion sequence, and a degree of stability of the gas supply during the maintenance time period;

determine a supply sequence of the maintenance time period based on the first loss feature;

predict a gas supply restoration duration based on the maintenance data;

determine the gas supply restoration time period based on the gas supply restoration duration;

determine a second loss feature based on the gas supply restoration duration;

wherein the second loss feature refers to a feature related gas supply during the gas supply restoration time period; and determine a supply sequence of the gas supply restoration time period based on the second loss feature.

10. The system according to claim 8, wherein the smart gas safety management platform is further configured to:

in response to a determination that the gas replenishment time period is completely within a gas supply restoration time period, generate a candidate pressure regulation scheme based on a predetermined system, the candidate pressure regulation scheme including a proportion of pressure allocated to a gas pipeline branch by a gas regulation station;

predict a gas replenishment effect of the candidate pressure regulation scheme; and in response to a determination that the gas replenishment effect satisfies predetermined requirements, determine the replenishment parameter based on the candidate pressure regulation scheme.

11. The system according to claim 10, wherein a pressure of the gas regulation station is allocated based on a degree of importance of a gas user of the gas pipeline branch, and the degree of importance is positively related to the proportion of pressure.

12. The system according to claim 10, wherein an upper limit of the proportion of pressure is related to a pressure bearing capacity of the maintenance pipeline branch.

13. The system according to claim 10, wherein the gas replenishment effect includes a supply sequence of the gas supply restoration time period, the supply sequence of the gas supply restoration time period is determined based on an updated second loss feature of the maintenance pipeline branch, and the smart gas safety management platform is further configured to:

predict the updated second loss feature of the maintenance pipeline branch by processing the candidate pressure regulation scheme, an inlet pressure of the pressure regulation station, a pipeline network distribution feature, and a second loss feature through an assessment model, the assessment model being a machine learning model; wherein the assessment model is obtained by training based on second training samples with second labels, the second training samples include the inlet pressure of the pressure regulation station, the pressure regulation schemes, the pipeline network distribution features, and the second loss feature in historical data, the second labels are obtained by following operations:

obtaining a set of second metering equipment data corresponding to the gas supply restoration time period after historical pressure regulation schemes are executed, the set of second metering equipment data including a reading of a second metering equipment and performance parameters of the second metering equipment, and the historical pressure regulation schemes corresponding to each set of second metering equipment data, respectively;

determining whether each set of reading of the second metering equipment is reliable based on the performance parameters of the second metering equipment;

excluding unreliable reading of the second metering equipment, and calculating historical second loss features of corresponding historical pressure regulation schemes based on the reliable reading of the second metering equipment, and using the historical second loss features as the second labels.

14. The system according to claim 8, wherein difference thresholds corresponding to the maintenance time period and the gas supply restoration time period are different, and the difference threshold corresponding to the maintenance time period is related to a degree of stability of the gas supply during the maintenance time period.

* * * * *